United States Patent
Williamson et al.

(10) Patent No.: US 6,732,763 B2
(45) Date of Patent: May 11, 2004

(54) STRETCH-RESISTANT PIPE LINER

(75) Inventors: John S. Williamson, Mansfield, MA (US); Jin Choi, Wilbraham, MA (US)

(73) Assignee: Lantor, Inc., Bellingham, MA (US)

( * ) Notice: Subject to any disclaimer, the term of this patent is extended or adjusted under 35 U.S.C. 154(b) by 0 days.

(21) Appl. No.: 10/154,390

(22) Filed: May 24, 2002

(65) Prior Publication Data
US 2003/0217777 A1 Nov. 27, 2003

(51) Int. Cl.[7] ............................... F16L 55/16
(52) U.S. Cl. .................. 138/98; 138/125; 405/150.1
(58) Field of Search .................. 138/98, 97, 125; 264/516, 36.17; 405/150.1; 156/287, 294

(56) References Cited

U.S. PATENT DOCUMENTS

| | | | |
|---|---|---|---|
| 3,935,046 A * | 1/1976 | Kiernan et al. | 156/148 |
| 4,009,063 A | 2/1977 | Wood | |
| 4,600,615 A | 7/1986 | Hyodo et al. | |
| 4,681,783 A * | 7/1987 | Hyodo et al. | 138/98 |
| 4,723,579 A | 2/1988 | Hyodo et al. | |
| 4,836,715 A * | 6/1989 | Wood | 405/150.1 |
| 4,976,290 A | 12/1990 | Gelin et al. | |
| 5,077,107 A * | 12/1991 | Kaneda et al. | 428/36.1 |
| 5,187,005 A | 2/1993 | Stahle et al. | |
| 5,411,060 A * | 5/1995 | Chandler | 138/98 |
| 5,454,142 A | 10/1995 | Neely et al. | |
| 5,501,248 A | 3/1996 | Kiest, Jr. | |
| 5,510,078 A | 4/1996 | Smith et al. | |
| 5,535,786 A * | 7/1996 | Makela et al. | 138/98 |
| 5,577,864 A | 11/1996 | Wood et al. | |
| 5,597,353 A | 1/1997 | Alexander, Jr. | |
| 5,624,629 A | 4/1997 | Wood | |
| 5,656,117 A | 8/1997 | Wood et al. | |
| 5,692,543 A | 12/1997 | Wood | |
| 5,706,861 A | 1/1998 | Wood et al. | |
| 5,836,357 A * | 11/1998 | Kittson et al. | 138/98 |
| 5,868,169 A | 2/1999 | Catallo | |
| 5,911,246 A * | 6/1999 | Kittson et al. | 138/98 |
| 5,915,419 A | 6/1999 | Tweedie et al. | |
| 5,919,327 A | 7/1999 | Smith | |
| 5,928,973 A | 7/1999 | Daniel et al. | |
| 5,934,332 A | 8/1999 | Rodriguez et al. | |
| 5,942,183 A | 8/1999 | Alexander, Jr. | |
| 6,001,212 A | 12/1999 | Polivka et al. | |
| 6,042,668 A | 3/2000 | Kamiyama et al. | |
| 6,086,984 A | 7/2000 | DiMaggio, Jr. et al. | |
| 6,117,507 A * | 9/2000 | Smith | 428/36.9 |
| 6,146,491 A | 11/2000 | Wood et al. | |
| 6,254,709 B1 * | 7/2001 | Kamiyama et al. | 138/97 |
| 6,296,729 B1 * | 10/2001 | Kamiyama et al. | 138/98 |
| 6,305,423 B1 * | 10/2001 | De Meyer et al. | 138/104 |
| 6,337,114 B1 | 1/2002 | Wood et al. | |
| 6,360,780 B1 * | 3/2002 | Adolphs et al. | 138/98 |
| 6,508,276 B2 * | 1/2003 | Radlinger et al. | 138/125 |
| 6,615,875 B2 * | 9/2003 | Adolphs et al. | 138/98 |
| 2002/0124898 A1 * | 9/2002 | Renaud et al. | 138/98 |

* cited by examiner

Primary Examiner—James Hook
(74) Attorney, Agent, or Firm—Foley & Lardner

(57) ABSTRACT

This invention provides stretch-resistant liners for lining pipes, pipes lined with stretch-resistant liners, and methods for lining pipes with stretch-resistant liners. The liners are made from a layer of stretch-resistant woven material, which may be a scrim, sandwiched between two layers of non-woven resin-impregnated material to form a laminate structure which is rolled into a tube to provide a liner having concentric sleeves.

24 Claims, 1 Drawing Sheet

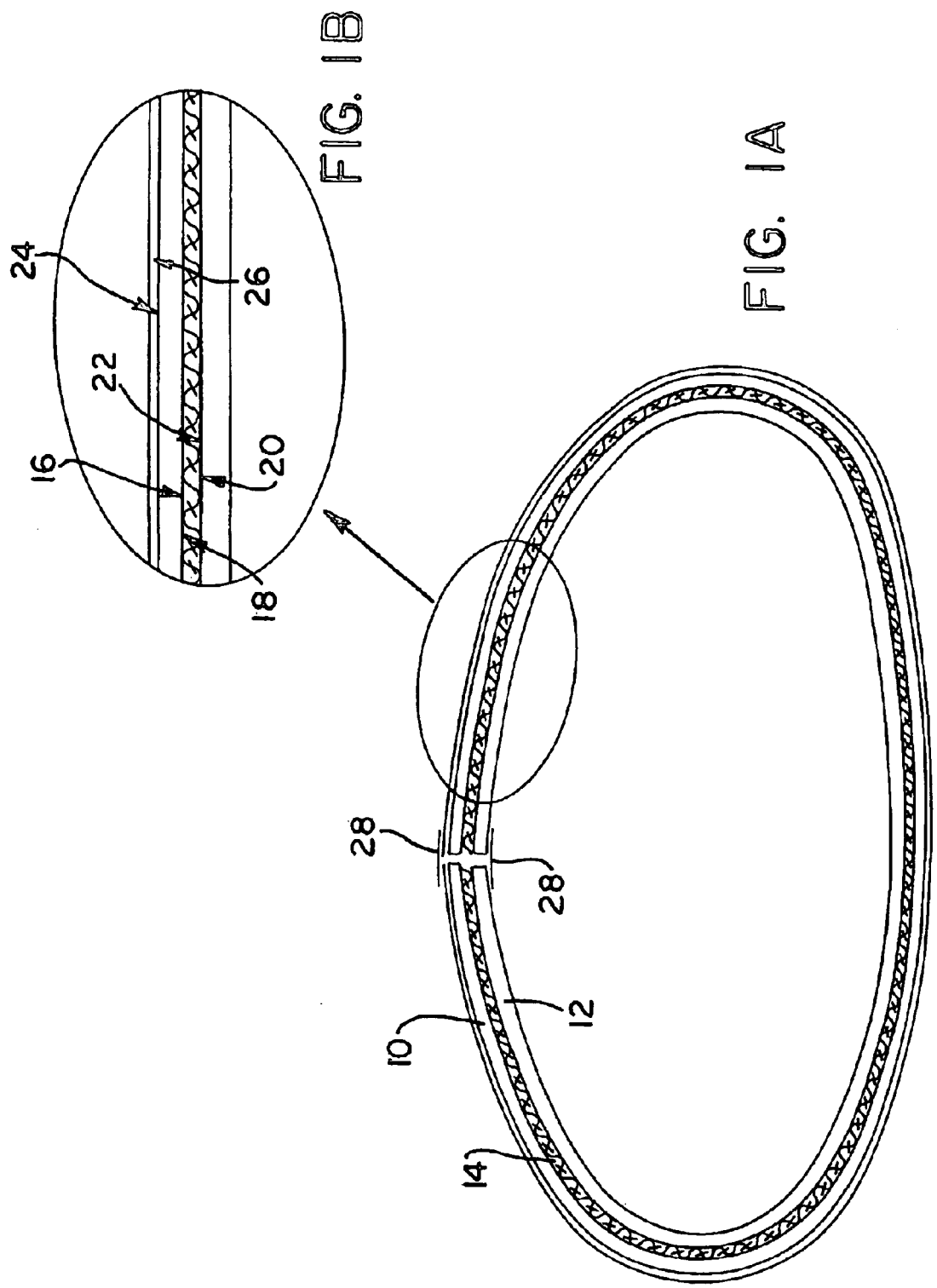

STRETCH-RESISTANT PIPE LINER

FIELD OF THE INVENTION

The present invention provides a tubular lining material for lining pipes. The liner is made from a support sleeve of stretch-resistant woven fabric disposed between two sealing sleeves of resin-impregnated non-woven material. The invention also provides pipes lined with the stretch-resistant liners as well as methods for lining pipes with stretch-resistant liners.

BACKGROUND OF THE INVENTION

Over time, pipelines, such as those used in sewer systems, water systems, and rainwater conductors, may undergo structural deterioration and develop cracks or leaks due to internal friction, large temperature swings, and the shifting of the earth. Unfortunately, because these pipes are typically buried, accessing the pipes to fix these cracks and leaks is no easy matter. This is particularly true for lateral pipes. Laterals are underground pipelines that connect a main pipeline to end users in buildings such as homes or office buildings. Laterals often connect with the main line at angles of up to 90° and are usually only accessible from one end. In addition, laterals have narrow diameters, typically only 4 to 6 inches, making cracks and leaks difficult to access from the inside.

To avoid the expense and effort of digging up sewer pipes and replacing flawed parts, a variety of methods for lining the interior of pipes have been developed. A common technique makes use of a curable resin-impregnated felt sleeve which may be inserted into a cracked pipe and expanded in a radial direction until it presses against the interior surface of the pipe. Once a sleeve has been fitted into the pipe in this manner, the resin contained within the felt is cured, bonding the felt to the pipe and producing a hardened internal liner.

Selecting the length of the liner for these applications is critical because the liner must cover the last joint before the lateral joins the main pipe. If the liner is too short and does not cover the joint, an additional process must be used to seal the joint which adds costs and usually does not provide a good final product. Conventional solutions include grouting the joint or inserting an additional partial liner over the joint. On the other hand, if the liner is too long and extends through the lateral into the main, it can create a blockage. Typically, the part of the liner that extends into the main must be removed with a robotic cutting device. For these reasons, controlling the location of the end of the liner is of considerable importance. Unfortunately, the radially expandable liners presently in use expand not only in the radial direction during application but in the axial direction as well, making it difficult to gauge the appropriate length of the liner prior to installation.

In the past, manufacturers of pipe liners have attempted to overcome these shortcoming by incorporating layers of fiberglass or carbon fiber into the liners because these materials are strong and do not stretch easily. Unfortunately, fiberglass and carbon fiber are relatively stiff, making these liners unsuitable for use in applications where the liner is installed by inverting it into the interior of the pipe.

Thus, a need exists for a pipe liner that is stretch-resistant in the longitudinal direction and that is easy and inexpensive to install.

SUMMARY OF THE INVENTION

The present invention provides stretch-resistant liners for pipes, pipes lined with stretch-resistant liners, and methods for lining pipes with stretch-resistant liners. The liners of this invention are particularly useful for lining lateral pipes and other pipes that cannot be easily accessed from both ends.

One aspect of the present invention provides a stretch-resistant liner for a pipe which is made of a multi-layered tube-shaped lining that includes a first sealing sleeve comprising a layer of non-woven material impregnated with a curable resin, the first sealing sleeve having an inner surface and an outer surface; a support sleeve comprising a layer of stretch-resistant woven material, the support sleeve having an inner surface and an outer surface; a second sealing sleeve comprising a layer of non-woven material impregnated with a curable resin, the second sealing sleeve having an inner surface and an outer surface; and optionally, a barrier layer comprising a film of air impermeable plastic which is coated onto the outer surface of the second sealing sleeve. Within this liner, the inner surface of the support sleeve is disposed against the outer surface of the first sealing sleeve and the outer surface of the support sleeve is disposed against the inner surface of the second support sleeve to form a tube-shaped liner having concentric sleeves. In one embodiment of this invention, the stretch-resistant woven material is a stretch-resistant scrim.

Another aspect of the invention provides pipes that are lined with stretch-resistant liners of the type described above.

Still another aspect of the invention provides a method for lining the interior of a pipe with a stretch-resistant liner, including the steps of cutting a stretch-resistant, tube-shaped, resin-impregnated liner having an external surface and an internal surface, to a predetermined length and radius, disposing the exterior surface of the liner against the inner surface of the pipe, and curing the resin in the liner to form a hardened lining against the interior surface of the pipe. The stretch-resistant liner described above is particularly suited for use with this method.

BRIEF DESCRIPTION OF THE DRAWINGS

FIG. 1 shows a cross-sectional view of a stretch-resistant liner according to the present invention.

DETAILED DESCRIPTION OF THE INVENTION

The stretch-resistant liners of the present invention are composed of at least three layers of fabric which are rolled into a tube to provide a liner having concentric fabric sleeves. FIG. 1 shows an example of a stretch-resistant liner according to the present invention. At least two of the at least three layers in the liner are sealing layers 10, 12 made from non-woven fabrics which are impregnated with curable resins. The third of the at least three layers is a support layer 14 made from a stretch-resistant woven material which is preferably a stretch-resistant scrim. The three layers described above are arranged in a laminate structure wherein the upper surface of the support layer 16 is disposed against the lower surface of a first sealing layer 18 while the lower surface of the support layer 20 is disposed against the upper surface of the second sealing layer 22 such that the sealing layers sandwich the support layer between them. In addition, the upper surface of the first sealing layer 24 may be coated with a barrier layer 26 which is a film of air impermeable plastic. When this multi-layered structure is rolled into a tube to form a liner, the barrier layer defines the outer surface of the liner and the lower surface of the second sealing layer defines the inner surface of the lining of the liner.

The advantages realized by this multi-layer tubular lining construction are threefold. First, because the liner incorporates a stretch-resistant fabric or scrim, the liner itself is stretch-resistant. This takes the guesswork out of sizing liners for coating pipes, prevents blockages that would be caused by extensions of liners past the end of the pipe, and eliminates the need for expensive trimming equipment. In addition, the stretch-resistant fabric provides a reinforcement or support for the non-woven materials, adding strength to the liner. The flexural strength and modulus for the materials exceeds the standards of 4,500 psi and 250,000 psi, respectively, set by the American Society of Testing and Materials (ASTM). Finally, the flexible nature of the multi-layer construction makes these liners easier to invert which is useful for liner installation, as discussed in more detail below.

Certain terms appear repeatedly in the description of the invention below. In order to facilitate a more clear understanding of this invention, these terms are defined below for the purpose of this disclosure.

Stretch. As used herein, the term stretch means the elongation of a material under an applied load.

Stretch-resistant. As used herein, the term stretch-resistant indicates that the material does not undergo substantial stretch under normal liner installation load conditions. Normal load conditions for a pipe liner include an internal pressure of about 2 to about 20 pounds per square inch (psi), but may be as high as about 30 psi.

Non-Woven Material: As used herein, the term non-woven material means a material having a porous sheet structure made from interlocking layers or networks of fibers, filaments, or filamentary structures. The fibers, filaments or filamentary structures may be directionally or randomly oriented and are bonded by friction, cohesion, or adhesion. Felt is one example of a non-woven material.

Woven Material: As used herein, the term woven material means a material made by a weaving process. These materials are typically composed of yarns or threads running lengthwise in the material and filling threads interlaced with each other at approximately right angles.

Scrim. As used herein, the term scrim means a loosely knitted fabric in which intersecting stitches are spaced relatively widely apart.

The support sleeve in the pipe liners of the present invention may be made of any woven material that is stretch-resistant as well as chemically resistant to the fluids and materials that will typically be flowing through the pipes to be lined. In addition, the support sleeve should be made of a material that will not release any environmentally harmful chemicals into the fluids and materials that pass through the pipes. The woven materials should also be capable of withstanding installation pressures and curing temperatures. Stretch-resistant scrims are a particularly suitable material for the support sleeve. Suitable woven materials and scrims include polyester, polypropylene, and nylon fabrics and scrims. Polyester is a particularly suitable material.

The woven material or scrim should be chosen such that it undergoes very little or no stretch during the installation of the liner into a pipe. Tests of elongation under a given load provide a measure of the stretchiness of a material. The woven fabrics used in the support sleeves have low elongations at a given load, compared to the fabrics used in other presently known pipe liners. In various embodiments of the present invention, the support sleeve will be made from a woven materials, which may be a scrim, having an elongation of less than about 5 percent at a load of 15 psi and less than about 20 percent at a load of 45 psi. This includes materials having an elongation of less than 3 percent at a load of 15 psi and less than 10% at a load of 45 psi and further includes materials having an elongation of less than 2.7 percent at a load of 15 psi and less than 10% at a load of 45 psi. Examples of stretch-resistant scrims that are suitable for use in a support sleeve include Scrim 9215 and Scrim 9599 sold by John Boyle and Company of Statesville, N.C. and Scrim W356 sold by Insulsafe Textiles, Inc. of Greene, Me. These are weft inserted warp knit scrims made from polyester yarn. Table 1 shows the results of elongation tests of a stretch-resistant polyester scrim that is suitable for use with the present invention to the present invention. The polyester scrim was subjected to varying loads. The test was conducted five times and the table shows the results for each test, as well as the mean elongation values and the standard deviation.

TABLE 1

| Test Number | Elongation at 15 psi | Elongation at 30 psi | Elongation at 45 psi | Elongation at 90 psi | Maximum Percent Strain |
|---|---|---|---|---|---|
| 1 | 1.3 | 2.4 | 3.1 | 9.2 | 18.8 |
| 2 | 1.6 | 2.7 | 3.6 | 10.1 | 79.8 |
| 3 | 0.8 | 1.7 | 2.6 | 9.9 | 91.7 |
| 4 | 1.1 | 1.6 | 2.3 | 8.9 | 80.5 |
| 5 | 0.8 | 1.5 | 2.4 | 9.1 | 70.4 |
| Mean | 1.1 | 2.0 | 2.8 | 9.4 | 80.9 |
| S.D. | 0.3 | 0.5 | 0.5 | 0.5 | 7.6 |

The materials that make up the stretch-resistant layer are preferably strong enough to reinforce the liner into which they are incorporated, yet flexible enough to allow for easy inversion of the liner during installation, without substantial cracking of the stretch-resistant layer. This is particularly important when the pipes to be lined have a small diameter, such as lateral pipes which have may have diameters of 4 to 6 inches, or even less. The tensile modulus of a material provides a measurement of the material's flexibility. In one preferred embodiment, the woven materials will have a tensile modulus of less than about 7 GPa. In another embodiment, the woven materials will have a tensile modulus of less than about 6 GPa. In yet another embodiment, the woven materials will have a tensile modulus of less than about 5 GPa or even less than about 2 GPa. Woven materials made from polyester, polypropylene, and nylon are suitably flexible for use in the liners of the present invention.

The sealing sleeves in the liners of the present invention may be made from any non-woven fabric that is able to absorb a thermoplastic, or thermoset, curable resin. As with the support sleeve, the sealing sleeves should be made from a material that is chemically resistant to the fluids and materials passing through the pipe, should be made of materials that do not release environmentally harmful chemicals into these fluids and materials, and should be capable of withstanding typical installation pressures and curing temperatures. The non-woven materials may be made by techniques well known in the art including carding, followed by crosslapping and needle punching. Felts are an example of a suitable non-woven material. Fiber materials that may be used to make the non-woven materials of the present invention include, but are not limited to, polyester fibers, polypropylene fibers, polyethylene fibers, acrylic fibers, aramid fibers, and combinations thereof.

The resins which are absorbed into the sealing layers of the liners may be any resins that can be cured within the non-woven material to form a hardened lining on the interior surface of a pipe. Preferably, the resins are of the type that may be cured at temperatures below about 100° C. and more preferably below about 85° C. Examples of suitable resins that may be absorbed into the sealing sleeves include polyester, vinyl ester, and epoxy resins, as well as thermosetting polyethylene resin. The resins may also include suitable catalysts to initiate and promote the crosslinking reactions.

The barrier layer which is coated onto the lower surface of the second sealing layer and which defines the outer surface of the liner is meant to prevent the resin from leaking out of the liner and to hold an internal pressure so that the liner may be inflated against the internal surface of a pipe during the installation process. As such, the barrier layer should be an air impermeable plastic film. Plastics which are suitable for the barrier layer, include, but are not limited to, polyvinyl chloride, polyethylene, polyurethane, and nylon. The barrier layer may be applied to the second sealing layer by conventional techniques well known in the art, including direct extrusion, melt coating, and lamination techniques.

The various fabric layers in the liners may be secured together into a laminate structure through conventional means well-known in the art, including stitching or gluing. However, in a preferred embodiment the layers are secured together using needle punching techniques. Such techniques are well-known in the art. Needle punching extensively entangles the fibers of the sealing layers into and around the fibers of the support layer, bonding the layers together mechanically. Needle punching is advantageous because it produces a laminate structure wherein the layers are bonded substantially uniformly throughout the body of the laminate structure. For example, the layers in a laminate that has been needle punched in a process that produces 1000 to 2000 needle punches per square inch will be bound together at approximately 100 to 500 points per square inch. This prevents individual layers from wrinkling within the laminate and prevents the layers from shifting or stretching with respect to one another. This represents a substantial improvement over other methods of securing the layers into a laminate, such as flame bonding or stitching. Both flame bonding and stitching produce a laminate structure wherein the layers are attached together at only a relatively few discrete points. In such a structure wrinkling of the individual layers within the laminate structure becomes a problem. In addition, flame bonding a non-woven material, such as a felt, reduces the material's ability to absorb resins. Thus, in order to avoid substantial impairment of the permeability of the felt, flame bonding must be done only lightly which reduces the number of bonding points between the layers in a laminate. In contrast, needle punching has no negative effect on ability of the sealing layers to absorb resin. Stitching also suffers from the drawbacks that it weakens the material and introduces holes which may lead to leaks in the liner.

Once the layers are secured together they may be formed into a tube-shaped liner using any conventional means. For example, the multi-layered laminate may be rolled into a tube having a seam, such as an overlap seam or a butt seam, running along its length. The seam may be welded or stitched together or may be held together with reinforcing tapes 28.

Another aspect of the present invention provides a method of lining a pipe with a stretch-resistant liner. This method includes the steps of cutting a stretch-resistant liner comprising a resin-impregnated non-woven fabric sleeve having an outer surface and an inner surface to a predetermined length and radius, disposing at least a portion of the outer surface of the tube-shaped liner against the interior surface of the pipe and curing the resin within the liner to form a hardened, liquid impermeable, jointless lining against the interior surface of the pipe. Care should be taken when cutting the liner prior to installation since the liner has little or no stretch in the longitudinal direction. Therefore, the length of the liner should be chosen so that it will cover the last joint before the lateral pipe joins the main pipe and the radius should be selected such that the external surface of the liner will fit fairly snugly against the internal surface of the pipe once it is installed.

The non-woven fabric sleeve in the liner may be impregnated with resin by conventional methods well known in the art. For example, the sleeve may be vacuum impregnated with a curable resin and run through a set of rollers to ensure a uniform distribution of the resin within the sleeve. Vacuum impregnation uses a vacuum to force air and moisture out of the non-woven material, allowing the resins to thoroughly penetrate the sleeve. The amount of resin absorbed into the liner is preferably sufficient to fill the open voids, or cells, in the material.

The multi-layered tube-shaped liners described above are particularly suitable for use with this method. In one embodiment of the method for lining a pipe, the liner is inverted into the pipe. In this embodiment, the liner is placed in a vessel capable of holding internal pressure, the liner extends out of the vessel through a tube and is attached to the outside of this tube, a pressurized fluid which may be an air or a liquid such as water is applied to the outside of the liner forcing the liner into the pipe, inner surface first, such that the liner is turned inside out, or everted, on the internal surface of the pipe as it proceeds deeper into the pipe. As a result, the lower surface of the second sealing sleeve which had defined the inner surface of the liner is turned out to become the external surface of the liner. This external surface is pressed up against at least a portion of the internal surface of the pipe when the liner is installed. At the same time, the upper surface of the first sealing sleeve, or the barrier layer on the first sealing sleeve, if present, which had defined the outer surface of the liner is turned inside out to become the internal surface of the liner. In a preferred method, the lining process is carried out by applying between about 2 psi and about 10 psi of air to the outer surface of the liner, however it may be necessary to use pressures up to and exceeding 30 psi.

Once the interior surface of the pipe is lined in this manner, the resin absorbed into the liner is cured. In a preferred embodiment, the resin in the liner does not require heat for curing. In an alternative embodiment the resins may be heat-curable and may be cured by exposing the interior of the liner to a hot fluid such as water, hot air or steam, to produce a hardened liner along the internal surface of the pipe. In a typical embodiment, the resin will be cured by heating the air or fluid used to evert the liner within the pipe. Typically the hot air or fluid will have a temperature of between about 50 and 100° C. In other embodiments, the resins may be cured by exposure to ultraviolet light.

While preferred embodiments have been illustrated and described, it should be understood that changes and modifications can be made in accordance with ordinary skill in the art without departing from the invention in its broader aspects as defined in the following claims.

What is claimed is:

1. A stretch-resistant liner for a pipe comprising:
   (a) a support sleeve comprising a layer of stretch-resistant woven material having a tensile modulus of less than about 8 Gigapascal, the support sleeve having an inner surface and an outer surface;

(b) a first sealing sleeve comprising a layer of non-woven material impregnated with a curable resin, the first sealing sleeve having an inner surface and an outer surface; and (c) a second sealing sleeve comprising a layer of non-woven material impregnated with a curable resin, the second sealing sleeve having an inner surface and an outer surface, wherein the outer surface of the support sleeve is disposed against the inner surface of the first sealing sleeve and the inner surface of the support sleeve is disposed against the outer surface of the second sealing sleeve to form a tube-shaped liner;

wherein the liner is sufficiently flexible to be inverted into a pipe during installation.

2. The stretch-resistant liner of claim 1 further comprising a barrier layer comprising a film of air impermeable plastic coated onto the outer surface of the first sealing sleeve.

3. The stretch resistant liner of claim 1 wherein the stretch resistant woven material is a stretch resistant scrim.

4. The stretch-resistant liner of claim 1 wherein the woven material is made from a material selected from the group consisting of polyester, polypropylene, and nylon.

5. The stretch-resistant liner of claim 1 wherein the non-woven material comprises polyester fibers, polypropylene fibers, polyethylene fibers, acrylic fibers, aramid fibers, or combinations thereof.

6. The stretch-resistant liner of claim 1 wherein the stretch-resistant woven material has an elongation of less than 5 percent at a load of 15 psi and an elongation of less than 20 percent at a load of 45 psi.

7. The stretch-resistant liner of claim 1 wherein the woven material has a tensile modulus of less than about 2 Gigapascal.

8. The stretch-resistant liner of claim 1 wherein the support sleeve, the first sealing sleeve, and the second sealing sleeve are secured together by needle punching.

9. A method for lining the interior surface of a pipe with a stretch-resistant liner comprising:

(a) inverting a tube-shaped, resin-impregnated liner into the pipe, the inverted liner having an outer surface and an inner surface the outer surface of the inverted liner disposed against the interior surface of the pipe; and (b) curing the resin in the liner to form a hardened lining against the interior of the pipe;

wherein the liner comprises a support sleeve comprising a layer of stretch-resistant woven material having a tensile modulus of less than about 8 Gigapascals, the support sleeve sandwiched between a first and a second sealing sleeve to form a tube-shaped liner having an inner surface and an outer surface, the first and second support sleeves each comprising a layer of non-woven material impregnated with a curable resin.

10. The method of claim 9 wherein the stretch-resistant liner further comprises a barrier layer comprising a film of air impermeable plastic coated onto the outer surface of the liner.

11. The method of claim 9 wherein the stretch-resistant woven material is a stretch-resistant scrim.

12. The method of claim 9 wherein the stretch-resistant woven material is made from a material selected from the group consisting of polyester, polypropylene, and nylon.

13. The method of claim 9 wherein the non-woven material comprises polyester fibers, polypropylene fibers, polyethylene fibers, acrylic fibers, aramid fibers, or combinations thereof.

14. The method of claim 9 wherein the woven material has an elongation of less than 5 percent at a load of 15 psi and an elongation of less than 20 percent at a load of 45 psi.

15. The method of claim 9 wherein the woven material has a tensile modulus of less than about 2 Gigapascal.

16. The method of claim 9 wherein the support sleeve and the first and second sealing sleeves are secured together by needle punching.

17. A pipe lined with a stretch resistant liner, comprising:

(a) a pipe having an interior surface; and (b) a support sleeve comprising a layer of stretch-resistant woven material having a tensile modulus of less than about 8 Gigapascal and being sufficiently flexible to be inverted, the support sleeve sandwiched between a first and a second sealing sleeve to form a tube-shaped liner having an inner surface and an outer surface, the first and second sealing sleeves each comprising a layer of non-woven material impregnated with a curable resin, wherein the outer surface of the tube-shaped liner is in contact with at least a portion of the interior surface of the pipe and further wherein the curable resin in the first and second sealing sleeves is cured to form a hardened lining against the interior surface of the pipe.

18. The pipe of claim 17 wherein the stretch-resistant liner further comprises a barrier layer comprising a film of air impermeable plastic coated onto the outer surface of the liner.

19. The pipe of claim 17 wherein the stretch-resistant woven material in the stretch-resistant liner is a stretch-resistant scrim.

20. The pipe of claim 17 wherein the stretch-resistant woven material in the stretch-resistant liner is made from a material selected from the group consisting of polyester, polypropylene, and nylon.

21. The pipe of claim 17 wherein the non-woven material in the stretch-resistant liner comprises polyester fibers, polypropylene fibers, polyethylene fibers, acrylic fibers, aramid fibers or combinations thereof.

22. The pipe of claim 17 wherein the stretch-resistant woven material in the stretch-resistant liner has an elongation of less than 5 percent at a load of 15 psi at an elongation of less than 20 percent at a load 45 psi.

23. The pipe of claim 17 wherein the woven material has a tensile modulus of less than about 2 Gigapascal.

24. The pipe of claim 15 wherein the support sleeve and the first and second sealing sleeves in the stretch-resistant liner are secured together by needle punching.

* * * * *